United States Patent
Seo

(10) Patent No.: US 12,268,304 B2
(45) Date of Patent: Apr. 8, 2025

(54) DISPLAY HOLDER

(71) Applicant: Il Yong Seo, Incheon (KR)

(72) Inventor: Il Yong Seo, Incheon (KR)

( * ) Notice: Subject to any disclaimer, the term of this patent is extended or adjusted under 35 U.S.C. 154(b) by 0 days.

(21) Appl. No.: 18/278,060

(22) PCT Filed: Mar. 2, 2022

(86) PCT No.: PCT/KR2022/002953
§ 371 (c)(1),
(2) Date: Aug. 21, 2023

(87) PCT Pub. No.: WO2022/186604
PCT Pub. Date: Sep. 9, 2022

(65) Prior Publication Data
US 2024/0148142 A1    May 9, 2024

(30) Foreign Application Priority Data

Mar. 5, 2021  (KR) .................. 10-2021-0029209
Jun. 23, 2021 (KR) .................. 10-2021-0081742

(51) Int. Cl.
*F16M 11/00* (2006.01)
*A47B 97/00* (2006.01)
(Continued)

(52) U.S. Cl.
CPC ......... *A47B 97/001* (2013.01); *F16M 11/043* (2013.01); *F16M 11/12* (2013.01); *F16M 2200/028* (2013.01); *F16M 2200/06* (2013.01)

(58) Field of Classification Search
CPC .... A47B 97/001; F16M 11/043; F16M 11/12; F16M 2200/028; F16M 2200/06;
(Continued)

(56) References Cited

U.S. PATENT DOCUMENTS 9,288,920 B1   3/2016 Steiner
9,625,091 B1 * 4/2017 Massey .................. F16M 11/04
(Continued)

FOREIGN PATENT DOCUMENTS

JP    H09294784 A    11/1997
KR    20140066427 A  6/2014
(Continued)

OTHER PUBLICATIONS

PCT Search Report for International Application No. PCT/KR2022/002953 mailed Jun. 2, 2022, 5 pp.
(Continued)

*Primary Examiner* — Amy J. Sterling
(74) *Attorney, Agent, or Firm* — The Roy Gross Law Firm, LLC; Roy D. Gross

(57) ABSTRACT

The present invention relates to a display holder comprising: a fixed frame (10) which is installed in an installation wall surface (1) and provided with an inclined rotary shaft (12) that is inclined downward toward the front side; a rotation bar (20) which forms a predetermined angle θ with the inclined rotary shaft (12) of the fixed frame (10) and has one end rotatably coupled to the inclined rotary shaft (12) so as to have a predetermined rotation trajectory about the inclined rotary shaft (12), and is inclined upward toward the front side when located at the highest point of the rotation trajectory; and a sliding bar (30) which has one end slidably coupled to the other end of the rotation bar (20), expands and contracts from the rotation bar (20) according to the rotation trajectory of the rotation bar (20), and has a display (2) mounted to the other end.

4 Claims, 8 Drawing Sheets

(51) Int. Cl.
*F16M 11/04* (2006.01)
*F16M 11/12* (2006.01)

(58) Field of Classification Search
CPC ......... F16M 2200/024; F16M 11/2028; F16M 11/2092; F16M 11/06; F16M 13/02; F16M 11/125
See application file for complete search history.

(56) References Cited

U.S. PATENT DOCUMENTS

| | | | |
|---|---|---|---|
| 11,492,848 B2* | 11/2022 | Kazanjian | E06C 7/423 |
| 2020/0355315 A1* | 11/2020 | Huang | F16M 11/16 |
| 2021/0199170 A1* | 7/2021 | Huang | F16M 11/2092 |
| 2023/0095802 A1* | 3/2023 | Hwang | F16M 11/046 |
| | | | 248/543 |
| 2024/0093830 A1* | 3/2024 | Barros | F16M 13/022 |
| 2024/0183488 A1* | 6/2024 | Ho | F16M 11/10 |

FOREIGN PATENT DOCUMENTS

| | | |
|---|---|---|
| KR | 20150104343 A | 9/2015 |
| KR | 20200004614 A | 1/2020 |

OTHER PUBLICATIONS

PCT Written Opinion for International Application No. PCT/KR2022/002953 mailed Jun. 2, 2022, 4 pp.

* cited by examiner

DISPLAY HOLDER

CROSS REFERENCE TO RELATED APPLICATIONS

This application is a National Phase of PCT Patent Application No. PCT/KR2022/002953 having International filing date of Mar. 2, 2022, which claims the benefit of priority of Korean Patent Application No. 10-2021-0081742, filed Jun. 23, 2021 and Korean Patent Application No. 10-2021-0029209, filed Mar. 5, 2021, the contents of which are all incorporated herein by reference in their entirety.

TECHNICAL FIELD

The present disclosure relates to a display holder, more specifically, a display holder with a simple structure and improved usability, wherein the holder is mounted on a wall adjacent to a bed or desk such that an optimal distance of the holder to a user's eyes is automatically adjusted according to the user's position or posture.

BACKGROUND ART

With the recent development of mobile communication technology, portable display devices such as mobile phones, tablets, laptops, etc., for displaying images have become widely available. A display holder is used to hold such a display device so that the user may view an image at a fixed location.

Such a conventional display holder is pivotably mounted on one side of a bed so that a patient with reduced mobility or a person who wants to enjoy a predetermined image while lying on a bed at home views an image.

However, the conventional display holder has a pivot range adjusted so that the user may view the image while lying on the bed and looking at the front scene. However, the pivot range is limited. Thus, in order that the user views the display device frontwards, the user has to turn his or her head according to the user's lying posture or position. Accordingly, not only the user may feel fatigue, but also diseases such as stiff neck and neck disc may occur.

In order to solve this problem, in Korean Patent No. 10-1701558 filed by the present applicant and patented, the holder frame is rotatably installed on the wall so that even when the user lies sideways on the bed, the user rotates the holder frame laterally and thus views the frond surface of the display device. Moreover, a bent frame on which the display device is mounted slides on a main frame. A through hole is formed in each of the bent frame and the main frame. A fixing pin is inserted into the through holes while the through hole of the bent frame and the through hole of the main frame are aligned with each other. Then, the bent frame extends or retracts from or into the main frame.

However, when the user lying on his back rotates the holder frame laterally while lying on his side, the display device becomes closer to the user's eyes due to the rotation radius of the holder frame. Thus, the user removes the fixing pin from the hole and extends the bent frame from the main frame, and then re-insert the fixing pin into the hole. Thus, this is cumbersome, resulting in poor usability. In particular, for a patient, the above manipulation is not easy because the hand of the patient does not reach the display device provided at the front end of the bent frame. The patient cannot change the posture alone and thus cannot watch the image in a comfortable posture.

DISCLOSURE

Technical Problem

The present disclosure is intended to solve the above-mentioned problems. The purpose of the present disclosure is to provide a display holder with a simple structure and improved usability, in which the holder may allow a distance from the display to the user's eyes to be easily adjusted by oneself so that an optimal distance from the display to the user's eyes is maintained without the help of others even when the user's posture or position changes, and thus the user may view the front surface of the display, and the holder may allow the user comfortably view the display in a comfortable posture without causing diseases such as stiff neck, thereby improving customer satisfaction.

Technical Solution

According to a feature of the present disclosure, there is provided a display holder comprising: a fixed frame 10 installed on an installation wall surface 1 and having an inclined rotation shaft 12 extending inclinedly downwardly frontwards; a rotatable bar 20 extending such that a predetermined angle θ is defined between the inclined rotation shaft 12 of the fixed frame 10 and the rotatable bar 20, wherein the rotatable bar 20 has one end rotatably coupled to the inclined rotation shaft 12 so as to have a predetermined rotation trajectory around the inclined rotation shaft 12, wherein when the rotatable bar 20 is rotated so as to be located at a top position of the rotation trajectory, the rotatable bar 20 extends inclinedly upwardly frontwards; and a slidable bar 30 having one end slidably coupled to the other end of the rotatable bar 20, wherein the slidable bar 30 extends or retracts from or into the rotatable bar 20 according to the rotation trajectory of the rotatable bar 20, wherein a display 2 is mounted at the other end of the slidable bar 30.

According to another feature of the present disclosure, there is provided the display holder in which the slidable bar 30 further includes a handle 60 protruding inwardly of the rotation trajectory, wherein the rotatable bar 20 has a guide opening 24 defined therein and extending along a longitudinal direction of the rotatable bar 20, wherein the handle 60 of the slidable bar 30 moves along and in the guide opening 24.

According to still another feature of the present disclosure, there is provided the display holder in which an elongate opening 22 is formed in a side surface of one of the rotatable bar 20 or the slidable bar 30 so as to extend in a longitudinal direction thereof, wherein a plurality of receiving grooves 32 are defined in the other of the slidable bar 30 or the rotatable bar 20 and are arranged so as to be spaced apart from each other along a longitudinal direction thereof, wherein a position adjustment pin 40 is inserted into one of the receiving grooves 32 through the elongate opening 22.

According to still yet another feature of the present disclosure, there is provided the display holder in which a stopper 50 for restricting rotation of the rotatable bar 20 is further disposed on the fixed frame 10 or the rotatable bar 20.

Advantageous Effects

As described above, according to the present disclosure, the slidable bar 30 on which the display 2 is mounted extends or retracts from or into the rotatable bar 20 by its own weight according to the rotation trajectory of the rotatable bar 20 as rotated so as to extend upwardly inclinedly from the installation wall surface 1 in the frontward direction. Thus, the distance between user U's eyes and the display 2 is automatically adjusted under the rotation of the rotatable bar 20. Thus, the structure of the holder is simple, and the user U does not need to get up from lying down and then to manually extend and retract the slidable bar 30, such that the convenience of use is improved. When a patient with reduced mobility wants to change the posture, the patient rotates only the rotatable bar 20 by hand, such that the display 2 is spaced from the patient's eyes at an appropriate distance. Thus, the user U may watch the display 2 in a comfortable posture, further improving usability. Further, the handle 60 is disposed on the slidable bar 30, and the guide opening 24 in and along which the handle 60 of the slidable bar 30 is displaced is formed in the rotatable bar 20, so that the user may grab the handle 60 and displace the slidable bar 30 to a desired position. Thus, the user may take more various postures and space the display 2 from their eyes at a more appropriate distance, such that the user may watch the display 2 in a more comfortable posture, so that the usability is further improved.

Moreover, each user U may adjust the distance by which the slidable bar 30 extends or retracts from or into the rotatable bar 20. Thus, the spacing between the eyes of user U and the display 2 mounted on the slidable bar 30 may be freely set to be more optimized according to the body structure or posture of each user U. Thus, each of several persons may easily adjust the spacing to be suitable for each person, thereby achieving excellent usability and versatility. Further, the fixed frame 10 or the rotatable bar 20 may be provided with the stopper 50 that limits the rotation of the rotatable bar 20, so that the rotatable bar 20 may be prevented from being rotated excessively and colliding with the installation wall surface 1 or surrounding objects, thereby improving safety.

BEST MODE

The purpose, features, and advantages of the present disclosure as described above will become clearer with reference to following detailed descriptions. Hereinafter, a preferred embodiment of the present disclosure will be described based on the accompanying drawings.

FIGS. 1 to 6 are diagrams illustrating a display holder according to an embodiment of the present disclosure. As shown, the display holder according to an embodiment of the present disclosure includes a fixed frame 10, a rotatable bar 20, and a slidable bar 30.

Figure 1:
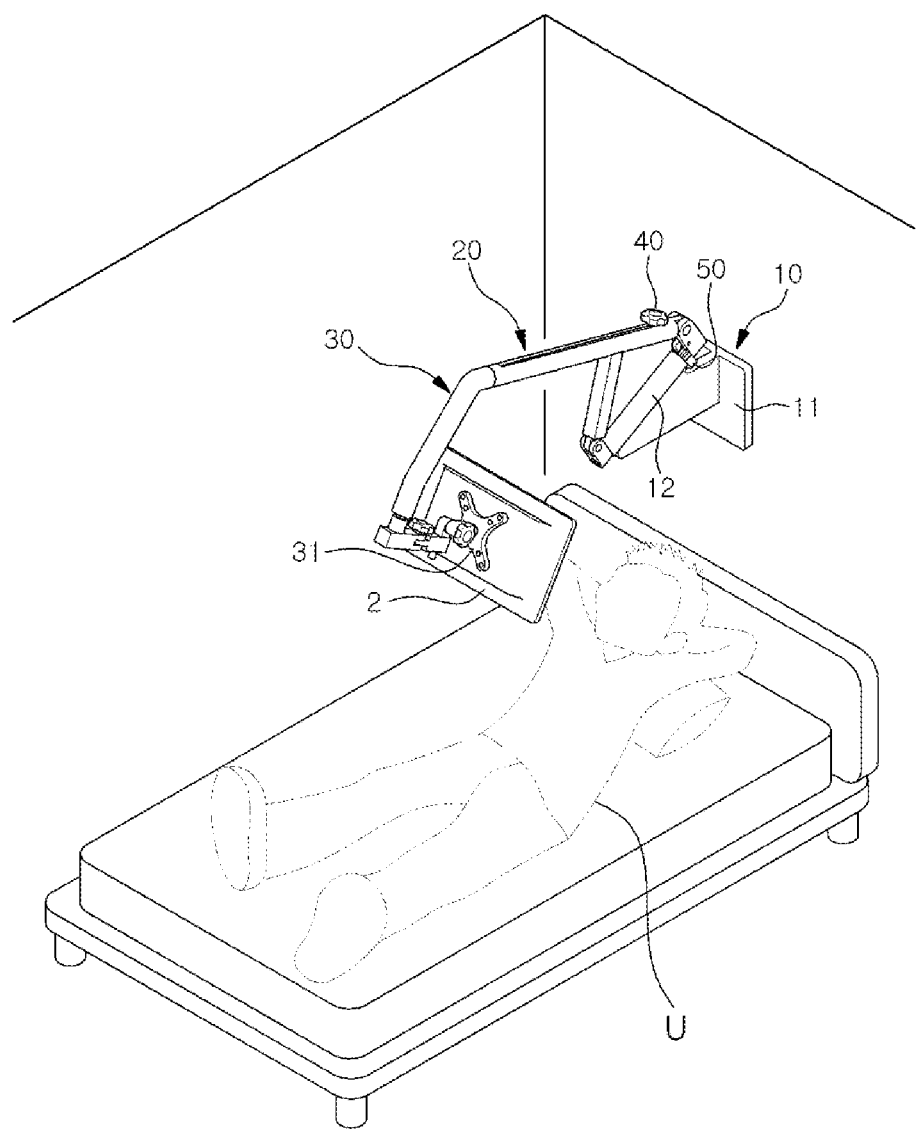
FIG. 1 is a use state diagram showing an embodiment of a display holder according to the present disclosure.
Figure 4:
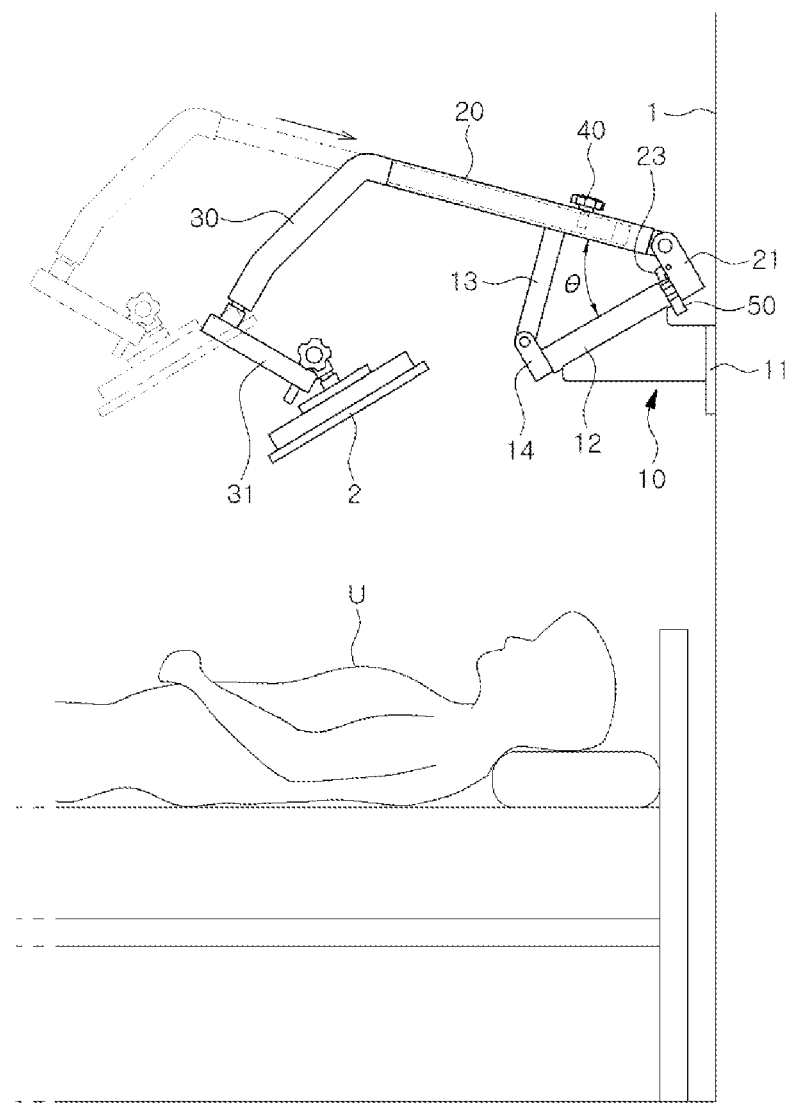
FIG. 4 is a first operating state diagram of the above embodiment.

The fixed frame 10 has an inclined rotation shaft 12 extending from an installation wall surface 1 inclinedly downwardly frontwards. As shown in FIG. 1 and FIG. 4, the fixed frame includes a fixed portion 11 fixed to the installation wall surface 1 and the inclined rotation shaft 12 disposed at a tip of this fixed portion 11.

The rotatable bar 20 has one end rotatably coupled to the inclined rotation shaft 12 of the fixed frame 10, while a certain angle θ is defined between the rotatable bar 20 and the inclined rotation shaft 12. The rotatable bar 20 is rotatable along a predefined rotation trajectory around the inclined rotation shaft 12. One end of the rotatable bar 20 may have a rotatable coupling ring 21 rotatably coupled to the inclined rotation shaft 12.

Figure 2:
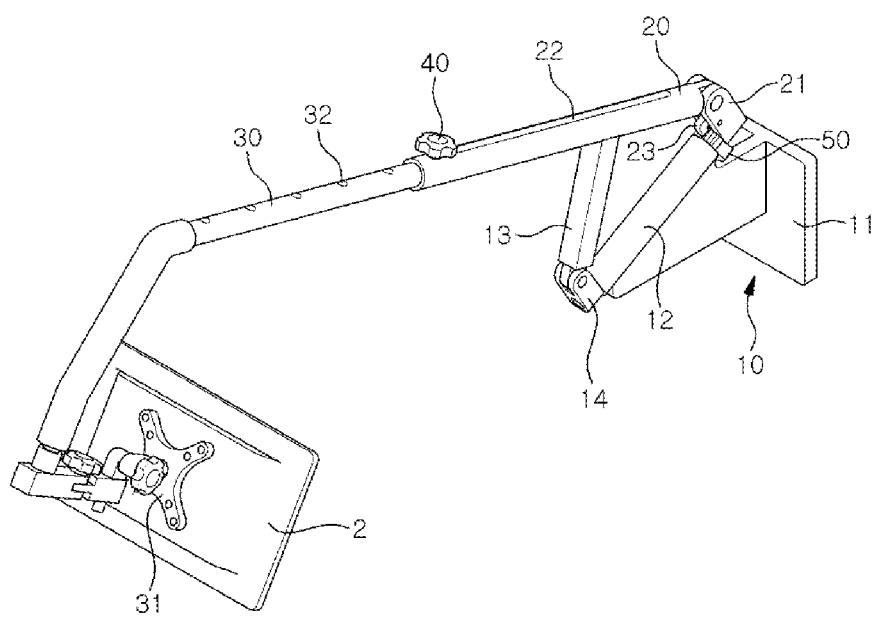
FIG. 2 is a perspective view of the above embodiment.

As shown in FIG. 4, when the rotatable bar 20 is located at a top position of the rotation trajectory, the rotatable bar 20 extends inclinedly upwardly from one end to the other end thereof. As shown in FIG. 1 and FIG. 2, one end of the rotatable bar 20 is rotatably coupled to an upper end of the inclined rotation shaft 12 of fixed frame 10. The display holder may further include a support bar 13 having one end rotatably coupled to the other end of the inclined rotation shaft 12 and the other end coupled to the rotatable bar 20 so as to more stably support the rotatable bar 20. An auxiliary rotatable coupling ring 14 rotatably coupled to the inclined rotation shaft 12 may be further provided at one end of the support bar 13.

The slidable bar 30 has one end slidably coupled to the other end of the rotatable bar 20, and is configured to automatically or manually extend or retract from or into the rotatable bar 20 according to the rotation trajectory of the rotatable bar 20. In this embodiment, an example in which the slidable bar 30 is configured to extend or retract from or into the rotatable bar 20 by its own weight according to the rotation trajectory of the rotatable bar 20 is illustrated. Moreover, the slidable bar 30 may be coupled to the rotatable bar 20 such that an end of the slidable bar 30 is caught on an end of the rotatable bar 20, and thus the slidable bar is prevented from being completely removed from the rotatable bar 20. Thus, even when the slidable bar 30 extends or retracts from or into the rotatable bar 20 by its own weight according to the rotation trajectory of the rotatable bar 20, the slidable bar may be prevented from being completely removed from the rotatable bar 20.

In one example, as shown in FIG. 2, a display support 31 on which a display 2 is mounted is disposed at the other end of the slidable bar 30. As is well known, the display support 31 may be configured to pivot in various directions around the end of the slidable bar 30.

Moreover, although a form in which the slidable bar 30 is inserted into the rotatable bar 20 is exemplified as shown in FIG. 2, a form in which the rotatable bar 20 is inserted into the slidable bar 30 may be used. In another example, the slidable bar 30 may not be bent or curved. However, it is preferable that the slidable bar 30 may have a bent or curved shape as shown in FIG. 2 so that the display 2 may be positioned at a more optimal distance from the eyes of the user U.

The display holder according to an embodiment of the present disclosure may be configured to adjust a length by which the slidable bar 30 extends or retracts from or into the rotatable bar 20. A body condition or posture varies based on each user. Thus, a length by which the slidable bar 30 extends or retracts from or into the rotatable bar 20 by its own weight may be adjusted such that the display 2 mounted on the slidable bar 30 may be positioned at a more optimal distance from the user's eyes.

In the display holder according to an embodiment of the present disclosure, in order to adjust the length by which the slidable bar 30 extends or retracts from or into the rotatable bar 20, an elongate opening 22 may be formed in one of the rotatable bar 20 or the slidable bar 30 and may extend along the longitudinal direction thereof, while a plurality of receiving grooves 32 may be spaced apart from each other and may be formed in the other of the slidable bar 30 or the rotatable bar 20 and may be arranged in the longitudinal direction of the other of the slidable bar 30 or the rotatable bar 20. Further, a position adjustment pin 40 may be inserted into a selected one of the receiving groove 32 through the elongate opening 22.

As shown in FIG. 2, an example in which the elongate opening 22 is formed in the rotatable bar 20 and the receiving grooves 32 are formed in the slidable bar 30 is illustrated. Accordingly, when the position adjustment pin 40 is inserted into the selected one of the receiving grooves 32 defined in one side of the slidable bar 30 through the elongate opening 22 of the rotatable bar 20, the position adjustment pin 40 may be caught on the end of the elongate opening 22 so that the length by which the slidable bar 30 extends or retracts from or into the rotatable bar 20 may be adjusted.

That is, as shown in FIG. 4, when the rotatable bar 20 is located at the top position of the pivoting trajectory, the slidable bar 30 is inserted into the rotatable bar 20 by its own weight. At this time, the position adjustment pin 40 is caught on one end of the elongate opening 22 of the rotatable bar 20, such that the slidable bar 30 is prevented from being further inserted into rotatable bar 20. Thus, the display 2 mounted on the other end of the slidable bar 30 may be prevented from being in excessive proximity to the eyes of the user U.

Figure 3:
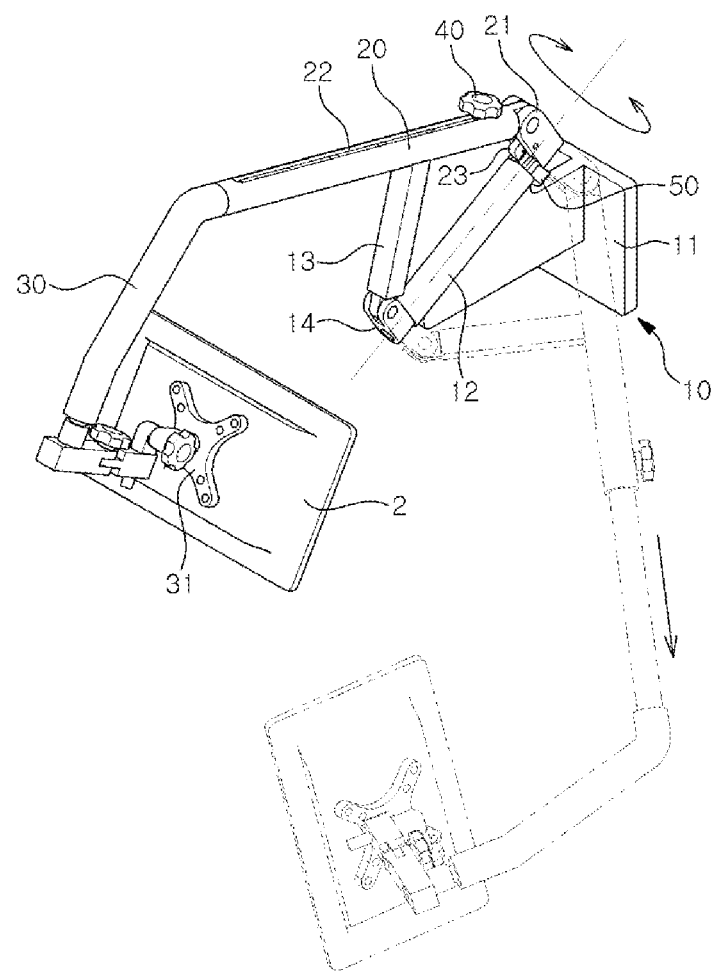
FIG. 3 is a diagram showing an operation of the above embodiment.
Figure 5:
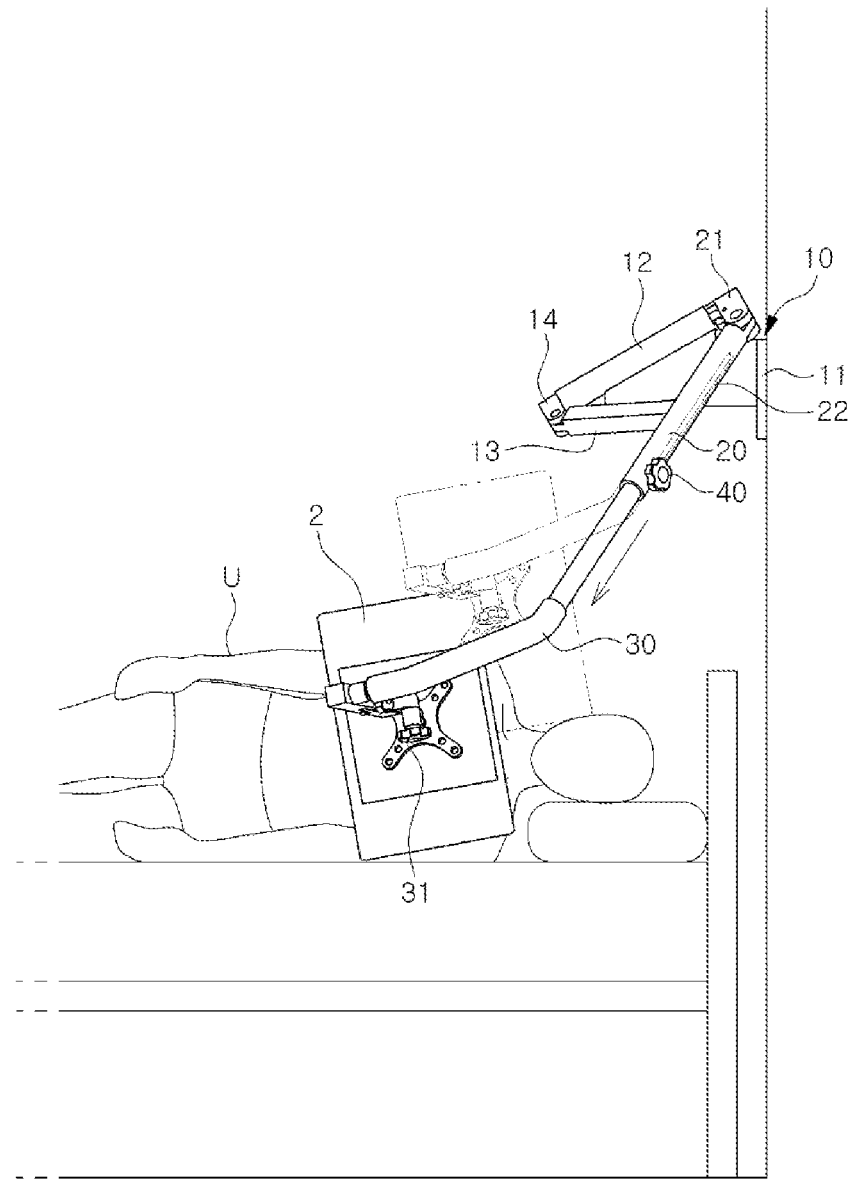
FIG. 5 is a second operating state diagram of the above embodiment.

Moreover, as shown in FIG. 3 and FIG. 5, when the rotatable bar 20 is rotated such that the rotatable bar 20 extends inclinedly downwardly from one end to the other end thereof, the slidable bar 30 extends from the rotatable bar 20 by its own weight. At this time, the position adjustment pin 40 is caught on the other end of the elongate opening 22 of the rotatable bar 20 to prevent the slidable bar 30 from further extending from the rotatable bar 20. Thus, the display 2 mounted at the other end of the slidable bar 30 may be properly spaced from the eyes of the user U.

Various schemes other than the above scheme may be applied to a configuration in which the length by which the slidable bar 30 extends or retracts from or into the rotatable bar 20 may be adjusted.

As shown in FIG. 5, when the user U rotates the rotatable bar 20 around the inclined rotation shaft 12 to watch the display 2 while the user is lying on his side, the display 2 becomes excessively close to user U's eyes. For this reason, the display 2 should be moved slightly away from the rotatable bar 20. According to the present disclosure, under the rotation of the rotatable bar 20, the slidable bar 30 automatically extends from the rotatable bar 20 by its own weight such that the display 2 is spaced apart from the rotatable bar 20, and as a result, the display 2 is automatically spaced from the eyes of the user U without a separate manipulation.

The display 2 should be positioned at the optimal viewing distance from the eyes of the user U at the rotated position of the rotatable bar 20 according to the user U's posture or physical condition. According to the present disclosure, the slidable bar 30 automatically extends from the rotatable bar 20 only via the rotation of the rotatable bar 20, thereby automatically adjusting the optimal viewing distance between the display 2 and the user U's eyes. This may improve usability and may allow the user U to view the display 2 in a comfortable position.

Figure 6:
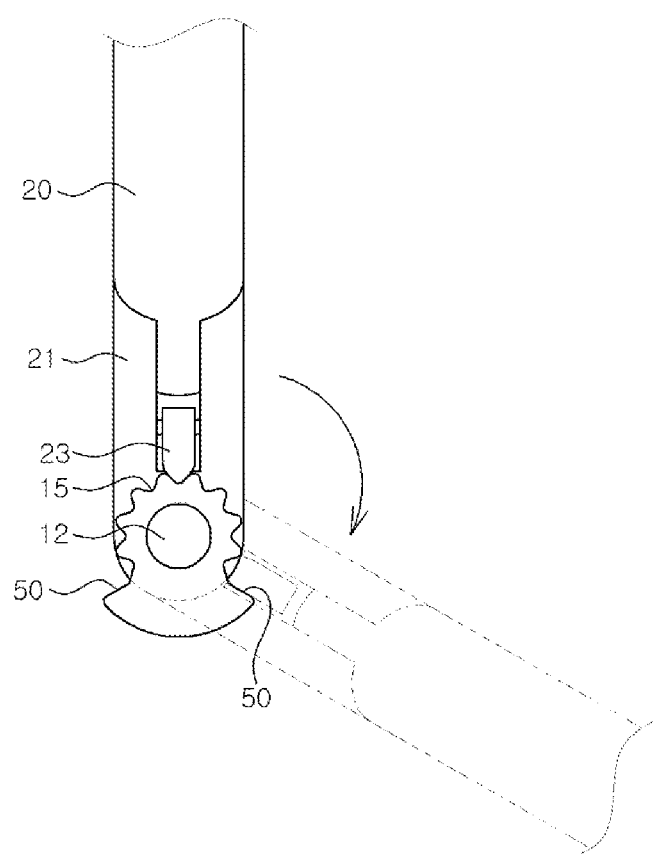
FIG. 6 is a diagram showing a stopper of the above embodiment.

The display holder according to an embodiment of the present disclosure may further include rotation adjustment means 15 and 23 capable of adjusting a position of the rotatable bar 20 along the rotation trajectory. As shown in FIG. 6, the rotation adjustment means 15 and 23 may include a plurality of fixing grooves 15 arranged so as to be spaced apart from each other on an outer circumferential surface of the inclined rotation shaft 12 of the fixed frame 10 and along a circumferential direction thereof; an elastic fixing protrusion 23 disposed on the rotatable bar 20 so as to be inserted into a selected one of the fixing grooves 15. The elastic fixing protrusion 23 may be rotated so as to be inserted into the fixing groove 15 around a rotational axis as not shown, and may be removed from the fixing groove 15 under an external force exceeding a predetermined force by a spring (not shown). Due to the rotation adjustment means 15 and 23, as shown in FIG. 1 and FIG. 4, even when the rotatable bar 20 is located at the top rotated position of the rotation trajectory, the rotatable bar 20 is prevented from being shaken laterally or rotated arbitrarily.

The display holder according to an embodiment of the present disclosure may further include a stopper 50 for limiting the rotation of the rotatable bar 20. This stopper 50 may be disposed on the rotatable bar 20 or the fixed frame 10. As shown in FIG. 6, an example in which the stopper 50 is disposed on the fixed frame 10 is shown. In this regard, the stopper 50 protrudes from an outer circumferential surface of the inclined rotation shaft 12 and is adjacent to the outermost fixing groove 15. A fixing protrusion 23 is engaged with the stopper. This may effectively prevent the rotatable bar 20 from being excessively rotated and colliding with installation wall surface 1 or surrounding objects.

In this embodiment, an example in which one position adjustment pin 40 is inserted into the selected one of the receiving grooves 32 of the slidable bar 30 through the elongate opening 22 of the rotatable bar 20 is illustrated. However, the present disclosure is not limited thereto. A configuration in which the length by which the slidable bar 30 is displaced may be various. For example, another position adjustment pin may be directly coupled to one of the receiving grooves 32 of the slidable bar 30 to adjust the length by which the slidable bar 30 is inserted into the rotatable bar 20. Moreover, a configuration in which the stopper 50 limits the rotation of the rotatable bar 20 may be various. For example, as the stopper 50 protrudes laterally from the rotatable bar 20 rather than the fixed frame 10 so as to contact the installation wall surface 1, the rotation of the rotatable bar 20 may be restricted.

Figure 7:
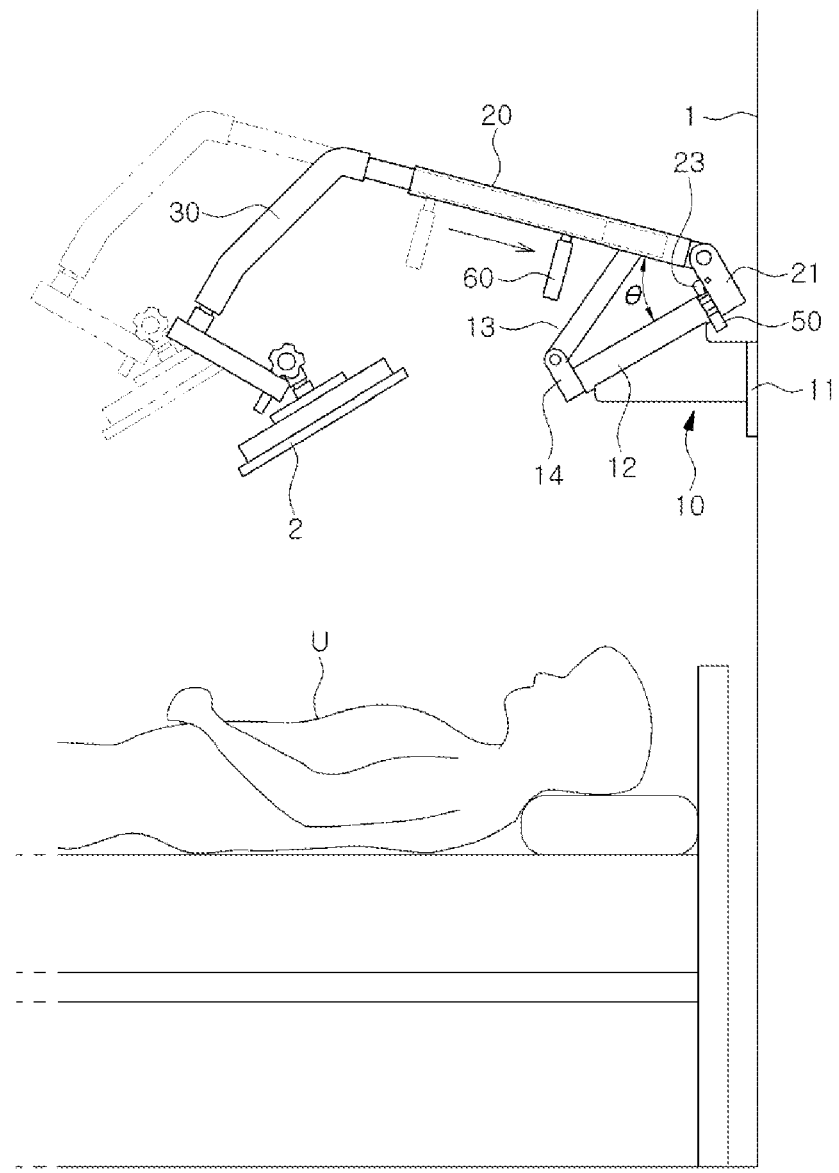
FIG. 7 is a side view of a display holder according to another embodiment of the present disclosure.
Figure 8:
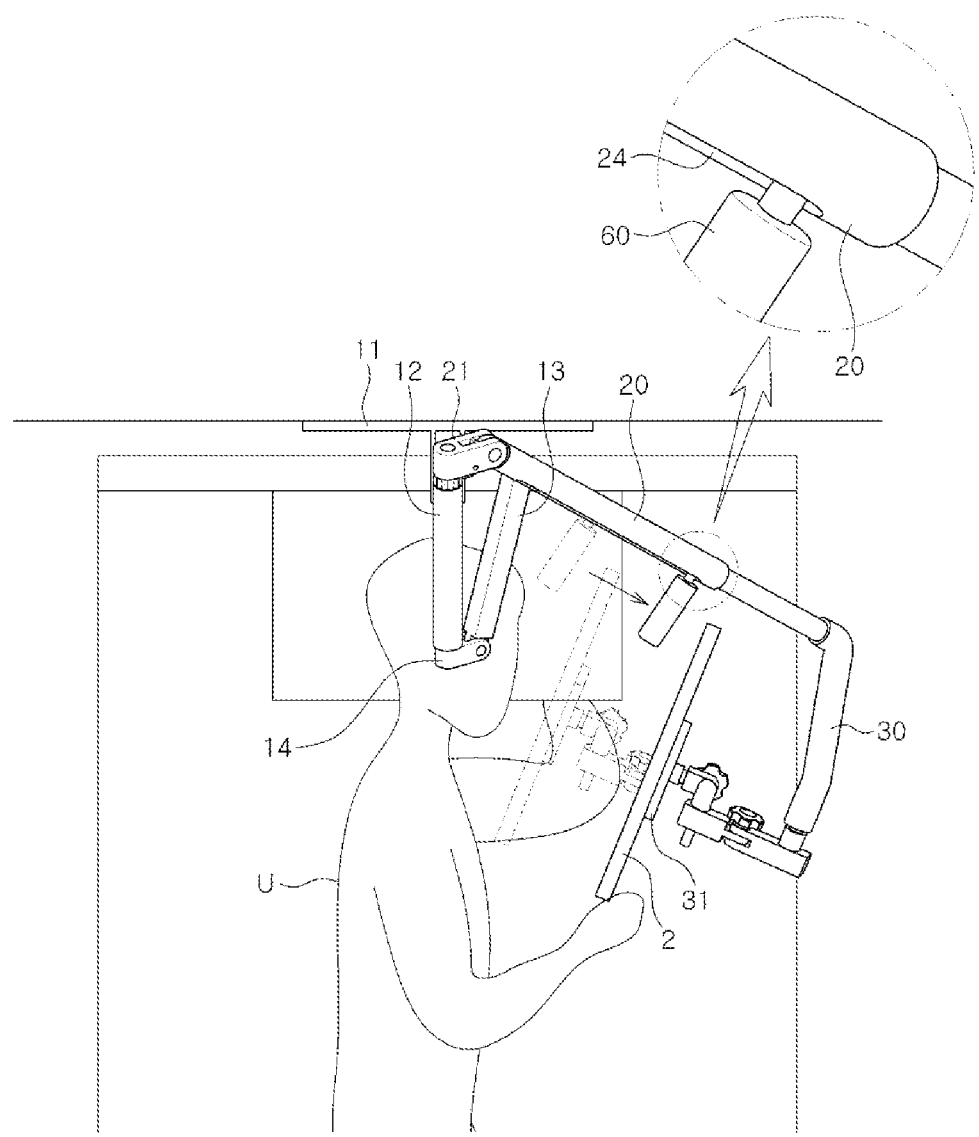
FIG. 8 is a plan view of the another embodiment.

FIG. 7 and FIG. 8 show a display holder according to another embodiment of the present disclosure. As shown, in the display holder according to another embodiment of the present disclosure, an example in which the slidable bar 30 manually extends and retracts from and into the rotatable bar 20 is illustrated.

That is, in this embodiment, the slidable bar 30 is configured to be manually displaced from the rotatable bar 20. For example, when the slidable bar 30 cannot extend and retract under its own weight, due to friction between the slidable bar 30 and the rotatable bar 20, the user may directly move the slidable bar 30. Further, when the slidable bar 30 does not slide by a desired length due to its own weight along the rotatable bar 20, the user may directly move the slidable bar 30.

For such manual extension and retraction, a handle 60 may be disposed on the slidable bar 30, and a guide opening 24 may be formed in the rotatable bar 20 so as to extend along the longitudinal direction thereof. Thus, the handle 60 of the slidable bar 30 may be displaced along the guide opening defined in the rotatable bar 20. As shown in FIGS. 7 and 8, it is preferable that the handle 60 of the slidable bar 30 protrudes inwardly of the rotation trajectory of the rotatable bar 20 so that the user U lying on the bed may easily grip the handle 60 of the slidable bar 30. In this regard, it is preferable that the guide opening 24 of the rotatable bar 20 extends in an oriented manner toward the center of the rotation trajectory.

Moreover, the slidable bar 30 may be configured such that the extension and retraction of the slidable bar 30 may be restricted as the handle 60 is caught at the end of the guide opening 24 of the rotatable bar 20. Depending on each user U, a length of the guide opening 24 may be properly adjusted. In some cases, the length by which the slidable bar 30 extends or retracts may be adjusted using separate fixing means. Since the slidable bar 30 may be fixed due to the friction between the slidable bar 30 and the rotatable bar 20, the length of the slidable bar 30 extends or retracts may be adjusted without the separate fixing means.

The user U may change the posture thereof while lying on the bed. In this case, while the user is holding the handle 60 of the slidable bar 30, the user rotates the rotatable bar 20 so that the display 2 is located at a straight distance from his/her eyes, and extends or retracts slidable bar 30 from or into the rotatable bar 20 in the changed posture thereof. Thus, even when the user takes more diverse postures, the display 2 may be positioned at an optimal distance from the user's eyes, so that the user may view the display 2 in a more comfortable posture.

The present disclosure as described above is not limited to the foregoing embodiments and the accompanying drawings. Rather, it will be obvious to those skilled in the art that various substitutions, modifications, and changes are possible within the scope that does not deviate from the technical spirit of the present disclosure.

The invention claimed is:

1. A display holder comprising:
    a fixed frame (10) installed on an installation wall surface (1) and having an inclined rotation shaft (12) extending inclinedly downwardly frontwards;
    a rotatable bar (20) extending such that a predetermined angle θ is defined between the inclined rotation shaft (12) of the fixed frame (10) and the rotatable bar (20), wherein the rotatable bar (20) has one end rotatably coupled to the inclined rotation shaft (12) so as to have a predetermined rotation trajectory around the inclined rotation shaft (12), wherein when the rotatable bar (20) is rotated so as to be located at a top position of the rotation trajectory, the rotatable bar (20) extends inclinedly upwardly frontwards from the installation wall surface (1); and
    a slidable bar (30) having one end slidably coupled to the other end of the rotatable bar (20), wherein the slidable bar (30) extends or retracts from or into the rotatable bar (20) by its own weight of the slidable bar (30) depending upon the rotation trajectory of the rotatable bar (20) and a display (2) is mounted at another end of the slidable bar (30) such that a distance between user's eyes and the display (2) is automatically adjusted under the rotation of the rotatable bar (20).

2. The display holder of claim 1, wherein the slidable bar (30) further includes a handle (60) protruding inwardly of the rotation trajectory,
    wherein the rotatable bar (20) has a guide opening (24) defined therein and extending along a longitudinal direction of the rotatable bar (20), wherein the handle (60) of the slidable bar (30) moves along and in the guide opening (24).

3. The display holder of claim 1, wherein an elongate opening (22) is formed in a side surface of one of the rotatable bar (20) or the slidable bar (30) so as to extend in a longitudinal direction thereof,
    wherein a plurality of receiving grooves (32) are defined in another of the slidable bar (30) or the rotatable bar (20) and are arranged so as to be spaced apart from each other along a longitudinal direction thereof,
    wherein a position adjustment pin (40) is inserted into one of the receiving grooves (32) through the elongate opening (22).

4. The display holder of claim 1, wherein a stopper (50) for restricting rotation of the rotatable bar (20) is further disposed on the fixed frame (10) or the rotatable bar (20).

* * * * *